(12) United States Patent
Kim et al.

(10) Patent No.: US 8,893,401 B2
(45) Date of Patent: Nov. 25, 2014

(54) LAMP HEATER AND DRYING APPARATUS INCLUDING THE SAME

(75) Inventors: Su-Hwan Kim, Yongin-si (KR);
Su-Young Byun, Yongin-si (KR);
Kyoung-Heon Heo, Yongin-si (KR);
Sang-Chul Seo, Yongin-si (KR);
Byoung-Kuk Kim, Yongin-si (KR)

(73) Assignee: Samsund SDI Co., Ltd., Yongin-si, Gyeonggi-do (KR)

( * ) Notice: Subject to any disclaimer, the term of this patent is extended or adjusted under 35 U.S.C. 154(b) by 859 days.

(21) Appl. No.: 12/923,306

(22) Filed: Sep. 14, 2010

(65) Prior Publication Data
US 2011/0067260 A1   Mar. 24, 2011

(30) Foreign Application Priority Data

Sep. 22, 2009 (KR) .................. 10-2009-0089697

(51) Int. Cl.
| | | |
|---|---|---|
| F26B 3/34 | (2006.01) | |
| H05B 6/70 | (2006.01) | |
| H05B 6/50 | (2006.01) | |
| B23K 11/24 | (2006.01) | |
| G05F 1/00 | (2006.01) | |
| F26B 3/30 | (2006.01) | |
| F26B 3/28 | (2006.01) | |
| F26B 13/10 | (2006.01) | |
| H01M 4/04 | (2006.01) | |
| B05D 3/02 | (2006.01) | |
| H01M 4/139 | (2010.01) | |

(52) U.S. Cl.
CPC .............. *B05D 3/0254* (2013.01); *F26B 3/283* (2013.01); *F26B 13/10* (2013.01); *Y02E 60/12* (2013.01); *H01M 4/04* (2013.01); *H01M 4/139* (2013.01); *B05D 2252/02* (2013.01)
USPC ............... 34/266; 34/275; 219/694; 219/704; 323/320; 323/237; 392/411

(58) Field of Classification Search
USPC ............ 34/201, 260, 266, 275; 315/250, 251; 392/390, 416, 7, 411; 219/694, 704; 323/300, 320, 212, 237
See application file for complete search history.

(56) References Cited

U.S. PATENT DOCUMENTS 5,010,659 A * 4/1991 Treleven .................. 34/269
5,604,385 A   2/1997 David
(Continued)

FOREIGN PATENT DOCUMENTS

| CN | 1941282 A | 4/2007 |
|---|---|---|
| JP | 04-183862 A | 6/1992 |

(Continued)

OTHER PUBLICATIONS

Office Action issued in corresponding Korean application, 10-2009-0089697, dated Jul. 8, 2011.
(Continued)

*Primary Examiner* — Kenneth Rinehart
*Assistant Examiner* — John McCormack
(74) *Attorney, Agent, or Firm* — Lee & Morse, P.C.

(57) ABSTRACT

A lamp heater and a drying apparatus including the same, the lamp heater including a plurality of three-phase power source lamps, a dummy load, the dummy load being configured to maintain a phase balance of the three-phase power source lamps, and a controller, the controller controlling the three-phase power source lamps and the dummy load depending on a lighting condition of the three-phase power source lamps.

17 Claims, 3 Drawing Sheets

(56) References Cited

U.S. PATENT DOCUMENTS

| | | | |
|---|---|---|---|
| 5,635,409 A | * | 6/1997 | Moslehi ............................ 438/7 |
| 5,775,002 A | * | 7/1998 | Iwase et al. .................... 34/122 |
| 6,018,203 A | | 1/2000 | David et al. |
| 2004/0065344 A1 | * | 4/2004 | Oka et al. ....................... 134/1.1 |

FOREIGN PATENT DOCUMENTS

| | | |
|---|---|---|
| JP | 07-295666 A | 11/1995 |
| JP | 08-172770 A | 7/1996 |
| JP | 10-125478 A | 5/1998 |
| JP | 2006-138499 A | 6/2006 |
| KR | 10-1999-0021876 A | 3/1999 |
| KR | 10-2006-0109151 A | 10/2006 |
| KR | 10-2007-0072259 A | 7/2007 |
| KR | 10-2007-0116432 A | 12/2007 |
| KR | 10-2009-0077362 A | 7/2009 |

OTHER PUBLICATIONS

Chinese Notice of Allowance in CN 201010290502.4, dated Jan. 24, 2013 (Kim, et al.).

Chinese First Office Action in CN 201010290502.4, dated Aug. 2, 2014, (Kim, et al.).

Korean Notice of Allowance in KR 10-2009-0089697, dated Jan. 30, 2012 (Kim, et al.).

\* cited by examiner

LAMP HEATER AND DRYING APPARATUS INCLUDING THE SAME

BACKGROUND

1. Field

Embodiments relate to a lamp heater and a drying apparatus including the same.

2. Description of the Related Art

Secondary batteries, e.g., lithium (Li) secondary batteries, are widely used in portable electronic/electric devices, e.g., cellular phones, laptop computers, camcorders, etc., because their operation voltage may be about three times higher, and their energy density per unit weight may be higher, compared to Ni—Cd and Ni-MH secondary batteries.

The secondary battery may include an electrode assembly, a can containing an electrolyte solution such that lithium ions can migrate between electrodes of the electrode assembly, and a cap assembly sealing the can. The electrode assembly may include a positive electrode plate having a positive electrode collector covered with a positive electrode active material and a positive electrode tab electrically connected to a side of the positive electrode collector. The electrode assembly may also include a negative electrode plate having a negative electrode collector covered with a negative electrode active material and a negative electrode tab electrically connected to one side of the negative electrode collector. The electrode assembly may also include a separator between the positive and negative electrode plates.

The positive and negative electrode plates of the electrode assembly may be formed by applying slurries including respective electrode active materials to the electrode collectors made of, e.g., a metal foil or metal mesh. The slurry may be prepared by mixing a solvent, a plasticizer, electrode active material, and a binder. In order for the electrode active material to be stably adhered to the electrode collector, a drying process for removing the solvent may be performed after the slurry is applied to a surface of the electrode collector.

The drying process may include a process of supplying heated air to a surface of the slurry as well as a process of heating the slurry using a lamp heater. In the process of supplying the heated air, a drying speed may vary depending on a position of the slurry relative to a flow direction of the heated air. Thermal energy of the heated air may be discharged along with the evaporated solvent, so that energy efficiency of the drying process may be low. The process of heating the slurry using the lamp heater may exhibit relatively higher drying efficiency and shorter drying time.

In the drying process using the lamp heater, power of the lamp heater may be regulated using a power regulating means, e.g., a thyristor power regulator (TPR). In the drying process using the lamp heater, a wavelength output from a lamp may be selected according to characteristics of a material to be dried. A peak wavelength output by the lamp heater may vary depending on applied power in view of characteristics of the lamp heater. However, in the case of a three-phase power source lamp capable of easily supplying high-capacity power, a phase balance may not be kept unless the lamp is switched on by a multiple of three, and thus drying efficiency and heat transfer efficiency may be lowered.

SUMMARY

Embodiments are directed to a lamp heater and a drying apparatus including the same, which represent advances over the related art.

It is a feature of an embodiment to provide a lamp heater having a plurality of three-phase power source lamps, in which lamps of the three-phase power source lamps maintain a phase balance when individually switched on, thereby making it possible to regulate applied power and output without a change in peak wavelength and thus prevent a decrease in drying efficiency and heat transfer efficiency.

At least one of the above and other features and advantages may be realized by providing a lamp heater including a plurality of three-phase power source lamps, a dummy load, the dummy load being configured to maintain a phase balance of the three-phase power source lamps, and a controller, the controller controlling the three-phase power source lamps and the dummy load depending on a lighting condition of the three-phase power source lamps.

The controller may include a lighting controller, the lighting controller controlling the lighting condition of the three-phase power source lamps, and a load controller, the load controller controlling a connection condition of the dummy load depending on the lighting condition of the three-phase power source lamps.

The lighting controller may include a first lighting switch, the first lighting switch controlling the lighting condition of a first lamp between a first power source line transmitting a first phase signal and a second power source line transmitting a second phase signal, a second lighting switch, the second lighting switch controlling the lighting condition of a second lamp between the second power source line and a third power source line transmitting a third phase signal, and a third lighting switch, the third lighting switch controlling the lighting condition of a third lamp between the first power source line and the third power source line.

The dummy load may include a first load between the first power source line and the second power source line, a second load between the second power source line and the third power source line, and a third load between the first power source line and the third power source line.

The load controller may include a first connection switch, the first connection switch connecting the first load depending on the lighting condition of the first lamp, a second connection switch, the second connection switch connecting the second load depending on the lighting condition of the second lamp, and a third connection switch, the third connection switch connecting the third load depending on the lighting condition of the third lamp.

At least one of the above and other features and advantages may also be realized by providing a drying apparatus for producing a secondary battery including a process chamber configured to contain a drying process, a transporter configured to transport an electrode plate, a lamp heater configured to heat the electrode plate, wherein the lamp heater includes a plurality of three-phase power source lamps, a dummy load configured to maintain a phase balance of the three-phase power source lamps, and a controller configured to control a lighting condition of the three-phase power source lamps and a connection condition of the dummy load.

The controller may include a lighting controller, the lighting controller being configured to control the lighting condition of the three-phase power source lamps, and a load controller, the load controller being configured to control the connection condition of the dummy load depending on the lighting condition of the three-phase power source lamps.

The lighting controller may include a first lighting switch, the first lighting switch being configured to control the lighting condition of a first lamp between a first power source line transmitting a first phase signal and a second power source line transmitting a second phase signal, a second lighting switch, the second lighting switch being configured to control the lighting condition of a second lamp between the second power source line and a third power source line transmitting a third phase signal, and a third lighting switch, the third lighting switch being configured to control the lighting condition of a third lamp between the first power source line and the third power source line.

The dummy load may include a first load between the first power source line and the second power source line, a second load between the second power source line and the third power source line, and a third load between the first power source line and the third power source line.

The load controller may include a first connection switch, the first connection switch being configured to connect the first load depending on the lighting condition of the first lamp, a second connection switch, the second connection switch being configured to connect the second load depending on the lighting condition of the second lamp, and a third connection switch, the third connection switch being configured to connect the third load depending on the lighting condition of the third lamp.

The drying apparatus may further include a first heated air supplier, the first heated air supplier being configured to supply heated air to a top surface of the electrode plate.

The first heated air supplier may be configured to supply the heated air in a drying direction, the transporter may be configured to transport the electrode plate in a transporting direction, and the drying direction may be opposite to the transporting direction.

The first heated air supplier may include a blowing unit, the blowing unit being disposed on a downstream side of the drying apparatus, the downstream side being where the electrode plate exits the drying apparatus, and an exhausting unit, the exhausting unit being disposed at an upstream side of the drying apparatus, the upstream side being where the electrode plate enters the drying apparatus.

The drying may further include a second heated air supplier, the second heated air supplier being configured to supply heated air to a bottom surface of the electrode plate.

The drying apparatus may further include a cooler, the cooler being configured to cool the lamp heater.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
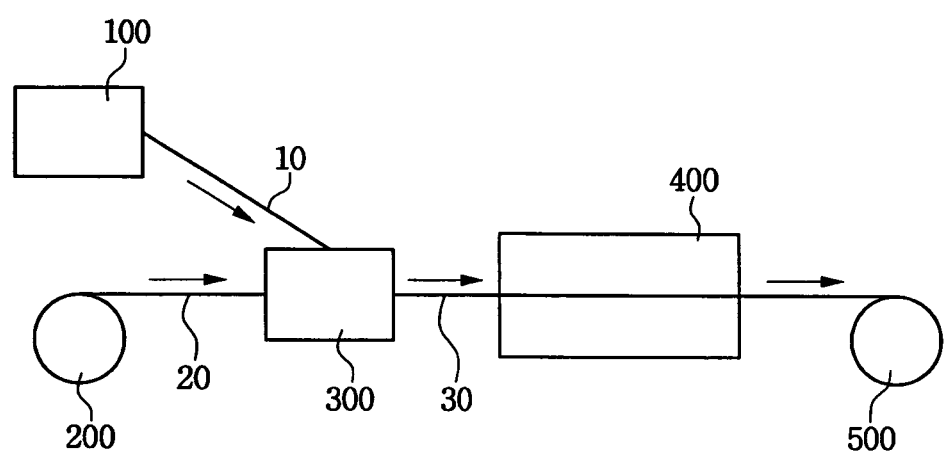
FIG. 1 illustrates a schematic view of an apparatus for producing an electrode plate for a secondary battery according to an embodiment.

Korean Patent Application No. 10-2009-0089697, filed on Sep. 22, 2009, in the Korean Intellectual Property Office, and entitled: "Lamp Heater Having Three-Phase Power Source Lamps and Drying Apparatus for Producing Secondary Battery Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout. It will be understood that, when an element is referred to as being "connected" to another element, it can be directly connected or coupled to the other element or it may be electrically connected or coupled to the other element via at least one intervening element.

FIG. 1 illustrates a schematic view of apparatus for producing an electrode plate from a slurry and a collector. Referring to FIG. 1, the apparatus according to an embodiment may include a slurry feed unit 100 for supplying a slurry 10, a collector feed unit 200 for supplying a positive or negative electrode collector 20, a coating unit 300 for coating the electrode collector 20 with the slurry 10 and forming an electrode plate 30, a drying unit 400 for evaporating a solvent from the slurry 10 on the electrode plate 30, and a electrode plate winding unit 500 for winding and storing the electrode plate 30 dried by the drying unit 400. The slurry 10 may include a positive or negative electrode active material, depending on the electrode plate 30 being produced.

The slurry feed unit 100 may store the slurry 10. The slurry 10 may be prepared by mixing a solvent with an electrode active material, e.g., a positive or negative electrode active material, a conductive material, and a binder. The slurry feed unit 100 may supply the slurry 10 to the coating unit 300 at a predetermined rate. The collector feed unit 200 may supply the positive or negative electrode collector 20 to the coating unit 300 in synchronization with the rate the slurry 10 is supplied from the slurry feed unit 100.

In an implementation, the positive electrode active material may include at least one of a lithium chalcogenide compound and a metal oxide. The metal oxide may be a lithium-containing transition metal oxide, e.g., $LiCoO_2$, $LiNiO_2$, $LiMn_2O_4$, or $LiNi_{1-x-y}Co_xM_yO_2$ (where $0 \leq x \leq 1$, $0 \leq y \leq 1$, $0 \leq x+y \leq 1$, and M represents a metal, e.g., Al, Sr, Mg, or La). The negative electrode active material may include a lithium metal, a lithium alloy, or a carbon material, e.g., crystalline carbon, amorphous carbon, carbon composite, or carbon fiber. The conductive material may supplement electrical conductivity of the positive or negative electrode active material, and may include, e.g., graphite, carbon black, and/or acetylene black.

The binder may bind the positive or negative electrode active materials with each other. In an implementation, the binder may include a synthetic rubber-based latex binder, e.g., styrene butadiene rubber (SBR) latex, nitrile butadiene rubber (NBR) latex, methyl methacrylate butadiene rubber latex, chloroprene rubber latex, carboxyl-modified styrene butadiene rubber latex, and polyorganosiloxane-modified polymer latex. In another implementation, the binder may include, e.g., acryl-based rubber having a cross-linked structure formed by a cross-linking reaction of a polymer or copolymer of an acryl-based main monomer and a cross-linkable comonomer. The solvent may include an organic solvent, e.g., a carbonate or ketone, or an aqueous solvent, e.g., ultra pure water or primarily distilled water. The carbonate may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC).

The electrode collector 20 may be formed of, e.g., stainless steel, nickel, copper, aluminum, and/or alloys thereof. In an implementation, the positive electrode collector may be formed of, e.g., aluminum or an alloy thereof. In another implementation, the negative electrode collector may be formed of, e.g., copper or an alloy thereof.

The coating unit 300 may apply the slurry 10 from the slurry feed unit 100 to the electrode collector 20 from the collector feed unit 200, thereby forming the electrode plate 30. The drying apparatus 400 may heat the electrode plate 30, thereby evaporating solvent from the slurry 10. The electrode plate winding unit 500 may wind and store the electrode plate 30 dried by the drying apparatus 400.

Figure 2:
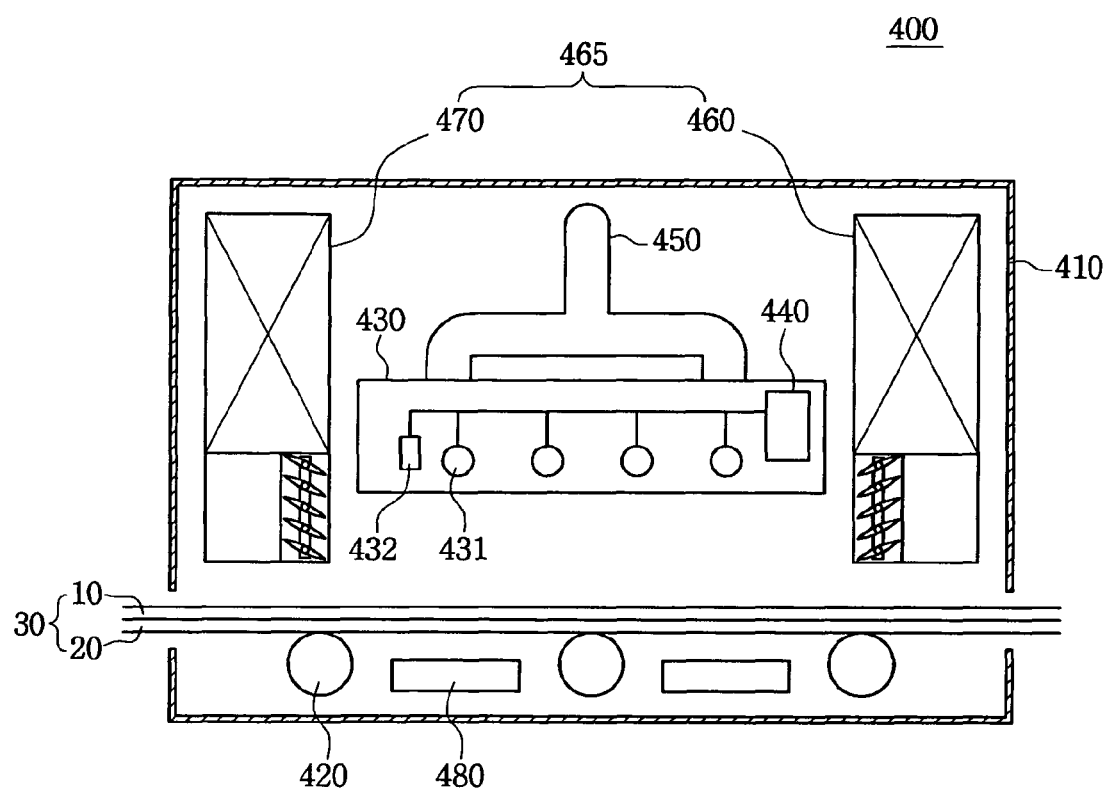
FIG. 2 illustrates a schematic view of a drying apparatus for drying an electrode plate according to an embodiment.
Figure 3:
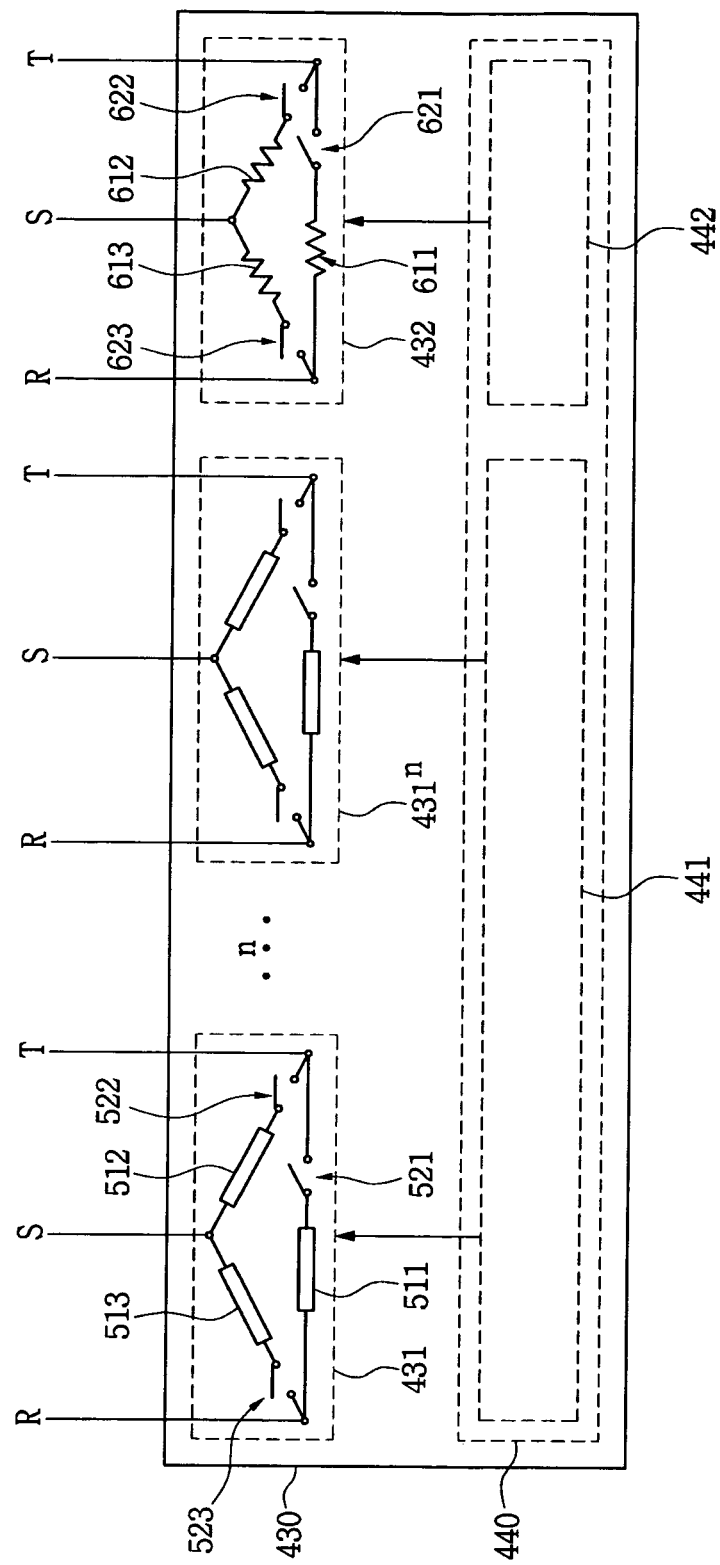
FIG. 3 illustrates a schematic view of a lamp heater for a drying apparatus for drying an electrode plate according to an embodiment.

FIG. 2 schematically illustrates a drying apparatus for drying an electrode plate according to an embodiment. FIG. 3 schematically illustrates a lamp heater for the drying apparatus for drying an electrode plate according to an embodiment.

Referring to FIGS. 2 and 3, the drying apparatus 400 for drying an electrode plate according to the present embodiment may include a process chamber 410 used for a drying process, a transporter 420 for transporting the electrode plate 30 along a transporting direction, and a lamp heater 430 for heating the electrode plate 30 to evaporate the solvent included in the slurry 10. In an implementation, the drying apparatus 400 may include an exhauster (not shown) for exhausting, e.g., the evaporated solvent.

The drying apparatus 400 may also include a first heated air supplier 465 for supplying heated air to a top surface of the electrode plate 30 and quickly evaporate the solvent from the slurry 10. The drying apparatus 400 may also include a second heated air supplier 480 supplying heated air to a bottom surface of the electrode plate 30. The drying apparatus 400 may further include a cooler 450 for cooling the lamp heater 430 in order to prevent drying efficiency from being reduced by overheating of the lamp heater 430.

The first heated air supplier 465 may include a blowing unit 460 and an exhaust unit 470. The blowing unit 460 may be disposed at a downstream side of the drying apparatus 400 and the exhaust unit 470 may be disposed at an upstream side of the drying apparatus 400. The downstream side of the drying apparatus 400 may be where the electrode plate 30 exits the drying apparatus 400. The upstream side of the drying apparatus 400 may be where the electrode plate 30 enters the drying apparatus 400. Accordingly, as is preferred, the heated air may be supplied in a drying direction opposite to the transporting direction of the electrode plate 30. Such a configuration may help ensure evaporation of the solvent by avoiding surface curing of the slurry 10 of the electrode plate 30 at the upstream side. In other words, the electrode plate 30 having the slurry 10 thereon entering the process chamber 410 may only be exposed to heated air having a relatively low temperature, preventing surface curing of the slurry 10 and undesirable trapping of solvent therein. In addition, supplying heated air having a relatively higher temperature at the downstream side of the drying apparatus 400 may help accelerate evaporation of the remaining solvent.

It is also preferable that the drying apparatus 400 exhausts the heated air and the evaporated solvent at the same time using the exhaust unit 470. Such a configuration may obviate the need for separate exhausters for heated air and solvent. In particular, because heated air having a relatively lower thermal energy may be exhausted with the solvent at the upstream side of the drying apparatus 400 after having moved along the electrode plate 30 in the drying direction opposite to the transporting direction, drying efficiency may be improved.

The lamp heater 430 may include a plurality (n) of three-phase power source lamps 431-431$^m$, a dummy load 432 for maintaining a phase balance of the three-phase power source lamps 431, and a controller 440 for controlling a lighting condition of the three-phase power source lamps 431 as well as a connection condition of the dummy load 432.

Each of the three-phase power source lamps 431 may include a first lamp 511 between a first power source line R transmitting a first phase signal and a second power source line T transmitting a second phase signal. Each of the three-phase power source lamps 431 may also include a second lamp 512 between the second power source line T transmitting the second phase signal and a third power source line S transmitting a third phase signal. Each of the three-phase power source lamps 431 may also include a third lamp 513 between the first power source line R transmitting the first phase signal and the third power source line S transmitting the third phase signal.

The dummy load 432 may include a first load 611 between the first power source line R and the second power source line T, a second load 612 between the second power source line T and the third power source line S, and a third load 613 between the first power source line R and the third power source line S.

The dummy load 432 may maintain the phase balance of the three-phase power source lamps 431. This may be achieved by connecting the dummy load 432 in place of the first to third lamps 511 to 513 that are not switched on when the first to third lamps 511 to 513 of the three-phase power source lamps 431 are individually switched on with the power of the lamp heater 430 regulated. In other words, when the first lamp 511 is switched on, the second and third loads 612 and 613 may be connected. When the first and second lamps 511 and 512 are switched on, the third load 613 may be connected. When the first, second, and third lamps 511, 512, and 513 are switched on, none of the loads may be connected. When the second and third lamps 512 and 513 are switched on, the first load 611 may be connected. In order to facilitate regulation of the power output of the lamp heater 430, it is preferable to control the first to third lamps 511 to 513 of the three-phase power source lamps 431 to be sequentially switched on, i.e. to sequentially determine a lighting sequence from the first lamp 511 of the first three-phase power source lamp 431 to the third lamp 513 of the last three-phase power source lamp 431', rather than control the first to third lamps 511 to 513 of the three-phase power source lamps 431 to be collectively switched on. Thus, it is preferable that the first load 611 has the same load as the first lamp 511, that the second load 612 has the same load as the second lamp 512, and that the third load 613 has the same load as the third lamp 513.

The controller 440 may control the lighting condition of the three-phase power source lamps 431 by individually switching on the lamps 511, 512, and 513 of the three-phase power source lamps 431, may control the connection of the dummy load 432 depending on the lighting condition of the three-phase power source lamps 431, and may maintain the phase balance of the three-phase power source lamps 431. As described above, the controller 440 may maintain the phase balance of the three-phase power source lamps 431 by connecting the second and third loads 612 and 613 of the dummy load 432 when only the first lamp 511 of the three-phase power source lamps 431 is switched on. The controller 440 may maintain the phase balance of the three-phase power source lamps 431 by connecting only the third load 613 of the dummy load 432 when the first and second lamps 511 and 512 of the three-phase power source lamps 431 are switched on.

In an implementation, the controller 440 may include a lighting controller 441 controlling the lighting condition of the lamps 511, 512, and 513 of the three-phase power source lamps 431 and a load controller 442 controlling the connection condition of the dummy load 432 depending on the lighting of the three-phase power source lamps 431.

The lighting controller 441 may include a first lighting switch 521 controlling the lighting condition of the first lamp 511, a second lighting switch 522 controlling the lighting condition of the second lamp 512, and a third lighting switch 523 controlling the lighting condition of the third lamp 513. The load controller 442 may include a first connection switch 621 connecting the first load 611 depending on the lighting condition of the first lamp 511, a second connection switch 622 connecting the second load 612 depending on the lighting condition of the second lamp 512, and a third connection switch 623 connecting the third load 613 depending on the lighting condition of the third lamp 513.

Consequently, the drying apparatus for drying an electrode plate according to an embodiment may individually light the lamps 511, 512, and 513 of the three-phase power source lamps 431 to regulate the output thereof, may connect the dummy load 432 having the loads corresponding to the respective lamps 511, 512, and 513 of the three-phase power source lamps 431 depending on the lighting condition of the three-phase power source lamps 431 to maintain the phase balance of the three-phase power source lamps 431. Thus, the drying apparatus may allow the individual lighting of the three-phase power source lamps 431 without a change in phase balance, and thereby regulate the output of the lamp heater to prevent a reduction in drying efficiency and heat transferring efficiency without a change in peak wavelength.

In addition, drying efficiency may also be improved due to the configuration of the first heated air supplier 465. Providing heated air at the downstream side, allowing the heated air to move in the drying direction opposite to the transporting direction of the electrode plate 30, and exhausting the cooler heated air and evaporated solvent may improve drying efficiency.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A lamp heater, comprising:
a three-phase power source lamp, the three-phase power source lamp including a first lamp between a first power source line and a second power source line, a second lamp between the second power source line and a third power source line, and a third lamp between the first power source line and the third power source line;
a dummy load configured to maintain a phase balance of the three-phase power source lamp, the dummy load including a first load between the first power source line and the second power source line, a second load between the second power source line and the third power source line, and a third load between the first power source line and the third power source line; and
a controller controlling the three-phase power source lamp and the dummy load depending on a lighting condition of the three-phase power source lamp, wherein the first load includes the same load as the first lamp, the second load includes the same load as the second lamp, and the third load includes the same load as the third lamp.

2. The lamp heater as claimed in claim 1, wherein the controller includes:
a lighting controller controlling the lighting condition of the three-phase power source lamp, and
a load controller controlling a connection condition of the dummy load depending on the lighting condition of the three-phase power source lamp.

3. The lamp heater as claimed in claim 2, wherein the lighting controller includes:
a first lighting switch controlling the lighting condition of a first lamp,
a second lighting switch controlling the lighting condition of a second lamp, and
a third lighting switch controlling the lighting condition of a third lamp.

4. The lamp heater as claimed in claim 1, wherein the load controller includes:
a first connection switch connecting the first load depending on the lighting condition of the first lamp,
a second connection switch connecting the second load depending on the lighting condition of the second lamp, and
a third connection switch connecting the third load depending on the lighting condition of the third lamp.

5. A drying apparatus for producing a secondary battery, comprising:
a process chamber configured to contain a drying process;
a transporter configured to transport an electrode plate;
a lamp heater configured to heat the electrode plate, wherein the lamp heater includes:
a plurality of three-phase power source lamps, each of the three-phase power source lamps including a first lamp, a second lamp and a third lamp,
a dummy load configured to maintain a phase balance of the three-phase power source lamps, the dummy load including a first load having the same load as the first lamp, a second load having the same load as the second lamp, and a third load having the same load as the third lamp, and
a controller configured to control a lighting condition of the three-phase power source lamps and a connection condition of the dummy load,
wherein the first lamp and the first load are connected a first power source line transmitting a first phase signal and a second power source line transmitting a second phase signal,
the second lamp and the second load is are connected the second power source line and a third power source line transmitting a third phase signal, and
the third lamp and the third load is are connected the first power source line and the third power source line.

6. The drying apparatus as claimed in claim 5, wherein the controller includes:
a lighting controller, the lighting controller being configured to control the lighting condition of the three-phase power source lamps, and
a load controller, the load controller being configured to control the connection condition of the dummy load depending on the lighting condition of the three-phase power source lamps.

7. The drying apparatus as claimed in claim 6, wherein the lighting controller includes
a first lighting switch, the first lighting switch being configured to control the lighting condition of a first lamp,
a second lighting switch, the second lighting switch being configured to control the lighting condition of a second lamp, and
a third lighting switch, the third lighting switch being configured to control the lighting condition of a third lamp.

8. The drying apparatus as claimed in claim 5, wherein the controller includes:
a first connection switch, the first connection switch being configured to connect the first load depending on the lighting condition of the first lamp,
a second connection switch, the second connection switch being configured to connect the second load depending on the lighting condition of the second lamp, and
a third connection switch, the third connection switch being configured to connect the third load depending on the lighting condition of the third lamp.

9. The drying apparatus as claimed in claim 5, further comprising a first heated air supplier, the first heated air supplier being configured to supply heated air to a top surface of the electrode plate.

10. The drying apparatus as claimed in claim 9, wherein:
the first heated air supplier is configured to supply the heated air in a drying direction,
the transporter is configured to transport the electrode plate in a transporting direction, and the drying direction is opposite to the transporting direction.

11. The drying apparatus as claimed in claim 10, wherein the first heated air supplier includes:
a blowing unit, the blowing unit being disposed on a downstream side of the drying apparatus, the downstream side being where the electrode plate exits the drying apparatus, and
an exhausting unit, the exhausting unit being disposed at an upstream side of the drying apparatus, the upstream side being where the electrode plate enters the drying apparatus.

12. The drying apparatus as claimed in claim 5, further comprising a second heated air supplier, the second heated air supplier being configured to supply heated air to a bottom surface of the electrode plate.

13. The drying apparatus as claimed in claim 5, further comprising a cooler, the cooler being configured to cool the lamp heater.

14. The lamp heater as claimed in claim 4, wherein the first connection switch connects the first load when the first lamp is off, the second lamp is on, and the third lamp is on.

15. The lamp heater as claimed in claim 4, wherein the second connection switch connects the second load when the first lamp is on, the second lamp is off, and the third lamp is on.

16. The lamp heater as claimed in claim 4, wherein the third connection switch connects the third load when the first lamp is on, the second lamp is on, and the third lamp is off.

17. The drying apparatus as claimed in claim 8, the load controller controls the first connection switch, the second connection switch and the third connection switch depending on the number of the first lamps which are off, the number of the second lamps which are off, and the number of the third lamps which are off.

* * * * *